(12) United States Patent
Kriltz et al.

(10) Patent No.: US 9,394,197 B2
(45) Date of Patent: Jul. 19, 2016

(54) SPANDREL COATING AND METHOD

(71) Applicant: Centre Luxembourgeois de Recherches pour le Verre et la Ceramique S.A. (C.R.V.C.), Dudelange (LU)

(72) Inventors: Uwe Kriltz, Jena (DE); Mario Olbrich, Leipzig (DE); Marion Homuth, Jena (DE); Andreas Heft, Gera (DE); Andreas Pfuch, Apolda (DE); Bernd Gruenler, Zeulenroda (DE)

(73) Assignee: Centre Luxembourgeois de Recherches Pour le Verre et la Ceramique S.A.R.L., Bertrange (LU)

( * ) Notice: Subject to any disclaimer, the term of this patent is extended or adjusted under 35 U.S.C. 154(b) by 956 days.

(21) Appl. No.: 13/628,832

(22) Filed: Sep. 27, 2012

(65) Prior Publication Data
US 2013/0022821 A1    Jan. 24, 2013

Related U.S. Application Data

(62) Division of application No. 11/178,595, filed on Jul. 12, 2005, now Pat. No. 8,287,701.

(51) Int. Cl.
*C03C 17/34* (2006.01)
(52) U.S. Cl.
CPC ......... *C03C 17/3435* (2013.01); *C03C 2218/17* (2013.01)
(58) Field of Classification Search
CPC .. C03C 17/3435; C03C 2218/17; B32B 17/06

USPC ............... 204/192.26, 192.27, 192.28
See application file for complete search history.

(56) References Cited

U.S. PATENT DOCUMENTS

| | | |
|---|---|---|
| 4,394,064 A | 7/1983 | Dauson |
| 4,474,856 A | 10/1984 | Meyer et al. |
| 4,478,905 A | 10/1984 | Neely, Jr. |
| 4,610,115 A | 9/1986 | Thompson, Jr. |
| 4,863,540 A | 9/1989 | Catalano et al. |
| 5,279,722 A | 1/1994 | Szczyrbowski et al. |
| 5,314,731 A | 5/1994 | Yoneda et al. |
| 5,505,989 A | 4/1996 | Jenkinson |
| 5,535,056 A | 7/1996 | Caskey et al. |

(Continued)

FOREIGN PATENT DOCUMENTS

| | | |
|---|---|---|
| EP | 0 678 485 | 10/1995 |
| GB | 2 311 791 | 10/1997 |
| WO | WO 2004/055296 | 7/2004 |

OTHER PUBLICATIONS

Supplementary European Search Report dated Oct. 23, 2013.

(Continued)

*Primary Examiner* — Rodney McDonald
(74) *Attorney, Agent, or Firm* — Nixon & Vanderhye P.C.

(57) ABSTRACT

A coated article for use in spandrel applications and/or the like is provided. In certain example embodiments, a coating is provided to have a coating design which permits the coating to realize more predictable and/or consistent optical characteristics such as glass side reflectance, color and/or the like. Certain example embodiments of this invention relate to a method of making a coated article for spandrel applications or the like. In certain embodiments, a powder inclusive lacquer coating is used as an overcoat.

7 Claims, 2 Drawing Sheets

(56) References Cited

U.S. PATENT DOCUMENTS

| | | |
|---|---|---|
| 5,800,918 A | 9/1998 | Chartier et al. |
| 5,800,933 A | 9/1998 | Hartig et al. |
| 6,524,714 B1 | 2/2003 | Neuman et al. |
| 6,558,800 B1 | 5/2003 | Stachowiak |
| 6,578,340 B2 | 6/2003 | Ishikawa et al. |
| 6,908,679 B2 | 6/2005 | Stachowiak et al. |
| 8,287,701 B2 | 10/2012 | Kriltz et al. |
| 2003/0049463 A1* | 3/2003 | Wang .................. C03C 17/3423 428/432 |
| 2004/0005467 A1 | 1/2004 | Neuman et al. |

OTHER PUBLICATIONS

U.S. Appl. No. 11/178,595, filed Jul. 12, 2005; Kriltz et al.

* cited by examiner

SPANDREL COATING AND METHOD

This application is a divisional of application Ser. No. 11/178,595 filed Jul. 12, 2005, now U.S. Pat. No. 8,287,701, the entire disclosure of which is hereby incorporated herein by reference in this application.

This invention relates to a coated article for use in spandrel applications and/or the like. In certain example embodiments, a coating is provided to have a coating design which permits the coating to realize more predictable and/or consistent optical characteristics such as glass side reflectance, color and/or the like. Certain example embodiments of this invention relate to a method of making a coated article for spandrel applications or the like.

BACKGROUND OF THE INVENTION

Curtainwall architecture, such as in office building and the like, includes both vision areas where windows are provided and opaque areas that are typically referred to as spandrels. Coated articles for spandrels are typically used in a manner similar to windows in that they enclose building structures, and are often provided at the exterior of a building or structure. Spandrel areas are formed by panels that are either opaque or substantially opaque, with the opaqueness or substantially opaqueness often being provided by an enamel coating or the like applied to a substrate.

Spandrel coatings are generally employed to conceal or mask portions of a structure or building that are not aesthetically pleasing if visible from the exterior of the structure or building. For example, coated articles for spandrels may be used to conceal from view one or more of the following from view from the exterior of a building: floor slabs, air conditioning equipment, heating ducts and so forth. Coated articles for spandrels may instead or also be used to maintain privacy or security such as at the ground level of a building.

Since the exterior of an office building or apartment building includes a combination of windows and coated articles for spandrels, the color and/or optical appearance of spandrel coatings is not irrelevant. In certain situations, it is desirable to have the coated articles for spandrels substantially match or otherwise compliment the appearance of windows (e.g., insulating glass or IG window units) of the building when viewed from the building exterior.

FIG. 1 is a cross sectional view of a conventional coated article for use in spandrel applications. The spandrel coated article of FIG. 1 includes a coating on glass substrate 1 that includes titanium oxide layer 3, metallic titanium layer 5, silicon nitride layer 7, and colored ceramic enamel frit layer 9 as an overcoat layer of the overall coating. Unfortunately, the spandrel coating of FIG. 1 is difficult to control and/or predict with respect to its optical characteristics. For instance, the FIG. 1 coating tends to have inconsistent glass side reflectance and/or color characteristics when used on surface #2 of monolithic spandrel applications (i.e., when used on the interior surface of a spandrel panel adjacent the building interior, as opposed to on the exterior surface of the panel).

Moreover, heat treatment is problematic for the spandrel coated article of FIG. 1 because the glass side reflectance and/or color characteristics of the coated article are not thermally stable. In other words, heat treatment such as thermal tempering tends to cause unpredictable dramatic changes in the optical characteristics (e.g., glass side reflectance and/or glass side reflective color) of the coated article of FIG. 1.

In particular, coated articles of FIG. 1 experience $\Delta E^*_g$ (glass side reflective) due to heat treatment of well over 10.0 which is very large. This large $\Delta E^*_g$ value indicates that the conventional coated article is not thermally stable, in that its glass side reflective optical characteristics change very much upon heat treatment such as thermal tempering. This is undesirable in that the final optical characteristics of the coated article then become too dependent upon processing conditions such as furnace conditions, heat treatment time/temperature and/or the like. It is noted that a detailed discussion of the $\Delta E^*$ calculation and meaning may be found in U.S. Pat. Nos. 6,908,679, 6,558,800 and/or 6,524,714, the disclosures of all of which are hereby incorporated herein by reference.

Thus, it will be appreciated that there exists a need in the art for a spandrel (or spandrel panel) that is more predictable and/or consistent with respect to its optical characteristics (e.g., color, reflection, and/or the like), especially after heat treatment such as thermal tempering or the like. It would be desirable if a coated article could be provided having a lower $\Delta E^*_g$ value due to heat treatment, which is indicative of a more thermally stable product.

BRIEF SUMMARY OF EXAMPLE EMBODIMENTS OF THE INVENTION

In certain example embodiments of this invention, the aforesaid conventional spandrel coated article is modified by removing the metallic titanium layer from the coating. Surprisingly, this modification results in a coated article for use in spandrel applications that is more predictable and/or consistent with respect to glass side optical characteristics (e.g., glass side reflectance and/or glass side color characteristics) following heat treatment. When the metallic titanium layer is not present, the coated article is more thermally stable (i.e., its optical characteristics do not change as much during heat treatment) and has a much more predictable and consistent reflectance and/or color characteristics following heat treatment. The removal of the metallic titanium layer surprisingly results in a much lower $\Delta E^*_g$ value as shown below, which is indicative of improved thermal stability upon heat treatment such as thermal tempering. Improved reproducibility of the coated article is thus possible. Because of the improved thermal stability and more consist reproducibility, it is also possible to use an overcoat layer of either a ceramic frit enamel or a powder lacquer type according to different example embodiments of this invention. The overcoat layer may be formed on the substrate either before or after thermal tempering of the substrate in different example embodiments of this invention.

In certain example embodiments of this invention, a powder lacquer type overcoat layer (which is opaque or substantially opaque in certain instances) may be formed on the substrate over the other layers of the coating in the following manner using a powder coating technique. Initially, a step is provided for removing all or substantially all dirt from the coated article surface intended to be coated by the overcoat via a cleanser, and applying preserving bonding agents to produce an adhesive joint layer onto which the powder paint is to be applied. Then, a thermochemical polymeric cross-linkage is caused to adhere the powder paint to the coated article. It is possible in certain example instances to use an acid alcoholic solution as the cleanser, and/or to produce the adhesive joint layer by deposition of a silicon oxide layer in a process of flame pyrolysis by decomposing silanes and/or siloxanes in the flame optionally in combination with subsequent applying of an organosilicon primer. This powder lacquer coating is advantageous in that it permits a wider range of colors to be used, and thus permits more flexibility with respect to appearance of the spandrel coated article. This embodiment using the powder lacquer coating may or may not be used in combination with the aforesaid embodiment of removing the metallic titanium layer in different embodiments of this invention.

In certain example embodiments of this invention, there is provided a coated article for use in spandrel applications, the coated article comprising: a glass substrate; a layer comprising titanium oxide provided on the glass substrate; a layer comprising silicon nitride provided on the glass substrate and located directly over and directly contacting the layer comprising titanium oxide; a colored opaque layer provided on the glass substrate over at least the layer comprising titanium oxide and the layer comprising silicon nitride; and wherein the coated article is thermally tempered prior to application of the colored opaque layer and has a $\Delta E^*_g$ value of no more than 6.0 due to the thermal tempering.

In other example embodiments of this invention, there is provided a coated article comprising: a glass substrate; a layer comprising titanium oxide provided on the glass substrate; a layer comprising silicon nitride provided on the glass substrate and located directly over and directly contacting the layer comprising titanium oxide; a colored opaque layer provided on the glass substrate over at least the layer comprising titanium oxide and the layer comprising silicon nitride.

In still further example embodiments of this invention, there is provided a method of making a spandrel panel, the method comprising: providing a glass substrate; sputter-depositing a first dielectric layer on the glass substrate; sputter-depositing a second dielectric layer on the glass substrate over at least the first dielectric layer; thermally tempering the article including the glass substrate with the first and second dielectric layers thereon to produce a tempered article; optionally applying a flame deposited silicon oxide layer and a primer layer on the tempered article, and then applying a powder paint over at least the primer layer.

In other example embodiments of this invention, there is provided a method of making a spandrel panel, the method comprising: providing a glass substrate; sputter-depositing a layer comprising titanium oxide on the glass substrate; sputter-depositing a layer comprising silicon nitride on the glass substrate over at least the layer comprising titanium oxide; thermally tempering the glass substrate with the layers comprising titanium oxide and silicon nitride thereon, so that the article has a $\Delta E^*_g$ value of no more than 6.0 due to the thermal tempering; and after said thermal tempering, applying an opaque overcoat layer on the substrate over at least the layers comprising titanium oxide and silicon nitride.

BRIEF DESCRIPTION OF THE DRAWINGS

FIG. 2 is a cross sectional view of a coated article according to an example embodiment of this invention, for use in spandrel applications and/or the like.

DETAILED DESCRIPTION OF EXAMPLE EMBODIMENTS OF THE INVENTION

Figure 1:
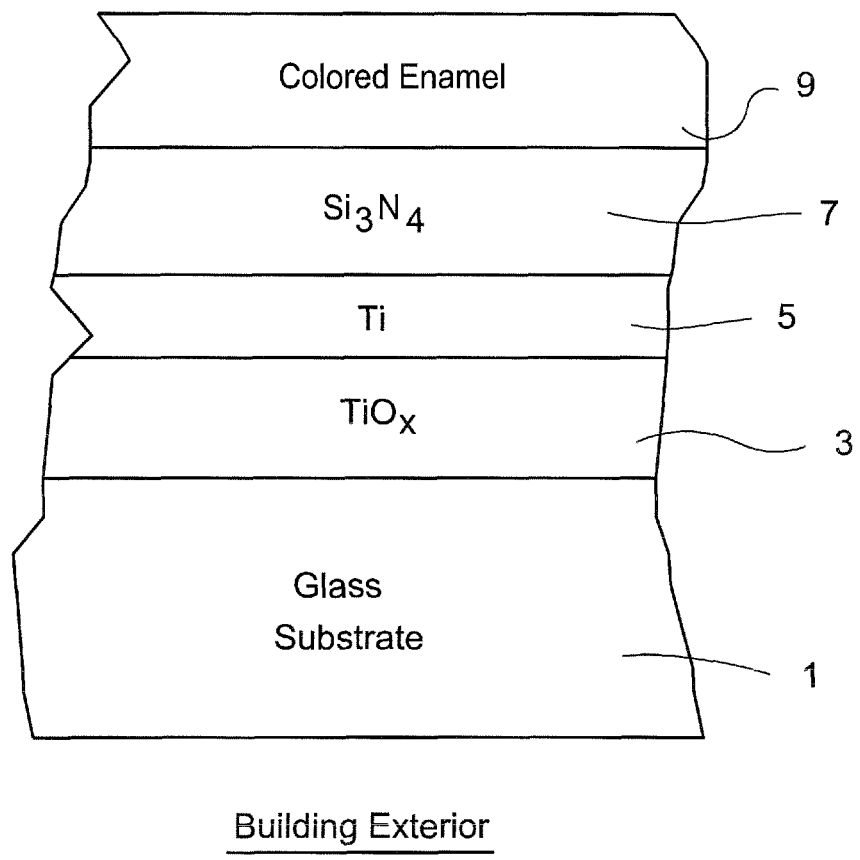
FIG. 1 is a cross sectional view of a conventional coated article for use in spandrel applications.

Referring now more particularly to the accompanying drawings in which like reference numerals indicate like parts throughout the several views.

Figure 2:
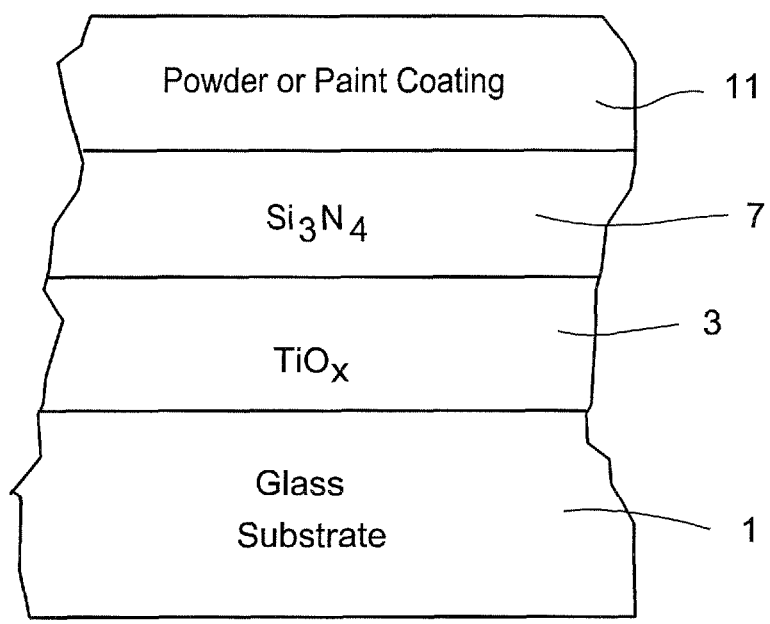

In certain example embodiments of this invention, the aforesaid conventional spandrel coated article of FIG. 1 is modified by removing the metallic titanium layer from the coating. The resulting coated article is shown in FIG. 2. Surprisingly, this modification results in a coated article for use in spandrel applications that is more predictable and/or consistent with respect to glass side optical characteristics (e.g., glass side reflectance and/or glass side color characteristics) following heat treatment. When the metallic titanium layer is not present, the coated article is more thermally stable (i.e., its optical characteristics do not change as much during heat treatment) and has a much more predictable and consistent reflectance and/or color characteristics following heat treatment. Improved reproducibility of the coated article is now possible. Because of the improved thermal stability and more consist reproducibility, it is also possible to use an overcoat layer of either a ceramic frit enamel or a powder lacquer type according to different example embodiments of this invention. The overcoat layer may be formed on the substrate either before or after thermal tempering of the substrate in different example embodiments of this invention.

FIG. 2 is a cross sectional view of a coated article for use in spandrel applications according to an example embodiment of this invention. It can be seen by comparing FIGS. 1 and 2 that the metallic titanium layer of FIG. 1 has been removed in the FIG. 2 embodiment of this invention. The coated article of FIG. 2 thus includes glass substrate 1 (e.g., soda lime silica based glass), dielectric layer 3 of or including titanium oxide, dielectric layer 7 of or including silicon nitride (e.g., $Si_3N_4$ or other suitable stoichiometry), and overcoat layer 11. In certain example embodiments, the titanium oxide layer may be characterized by $TiO_x$, where x is from 1.5 to 2.3, more preferably from 1.8 to 2.0, with about 2.0 being a specific example for x. The silicon nitride based layer 7 may be doped with other material(s) in certain example instances, such as aluminum. For example, the silicon nitride layer 7 may include from about 1-10% Al in certain example embodiments of this invention, more preferably from about 1-3% Al. Likewise, the titanium oxide based layer 3 may be doped with other material(s) in certain example instances. In different embodiments of this invention, overcoat layer 11 may be of or include a ceramic frit enamel or a powder lacquer type painted on layer. In any event, overcoat layer 11 is opaque or substantially opaque in certain example embodiments of this invention, and is colored in a manner so as to cause the spandrel coated article to have desired color and/or appearance when viewed form the exterior of the building.

In certain example embodiments of this invention, the titanium oxide layer 3 is from about 15 to 100 nm thick, more preferably from about 20 to 35 nm thick, with an example being about 26 nm thick. In certain example embodiments, the silicon nitride layer 7 is from about 3 to 25 nm thick, more preferably from about 4 to 12 nm thick, with an example being about 8 nm thick.

In certain example embodiments of this invention, the coating of the illustrated coated article is provided on the interior surface of the substrate 1 so that the substrate 1 is between the building exterior and the coating as shown in FIG. 2. Thus, the opaque overcoat layer 11 is viewed through both glass substrate 1 and layers 3, 7 by one positioned outside of the building. This means that both the color of the overcoat 11 and the glass side reflective characteristics (e.g., color and/or reflectance) of the overall coating are to be taken into consideration since they are both subject to view. The respective thicknesses of layers 3 and 7 are adjusted to optimize the desired color and/or optical characteristics of the coated article.

In certain example embodiments, the coated article of FIG. 2 may be made as follows. Glass substrate 1 is provided. Titanium oxide inclusive layer 3 is sputter-deposited on the glass substrate 1 using a rotatable magnetron sputtering target of either metallic Ti or $TiO_x$, in a gaseous atmosphere comprising at least oxygen gas. Then, the silicon nitride inclusive layer 7 is sputter-deposited on the substrate 1 over at least the titanium oxide layer 3, using a rotatable magnetron sputtering target of SiAl, where the Al content is from about 1-20%, more preferably from about 1-10%, and sometimes from about 1-3%. The sputtering of the silicon nitride inclusive layer 7 may be carried out in an atmosphere comprising a mixture of nitrogen and argon gases. The coated article including glass substrate 1 with layers 3 and 7 thereon is then heat treated for the purpose of thermally tempering the coated article. While tempering is not required in all instances, it is preferred in certain example embodiments of this invention. After the thermal tempering, the opaque overcoat layer 11 is applied to the tempered glass substrate over layers 3 and 7. In the event that the overcoat layer 11 is of or includes a colored ceramic enamel frit, then the coated article following application thereof is again heat treated in a manner sufficient to harden/cure the enamel frit layer 11 thereby resulting in the spandrel coated article. Alternatively, if the powder lacquer type colored paint overcoat is used for overcoat layer 11, then a discussion of this alternative is given below.

Set forth below is a discussion of an example technique for forming the overcoat layer 11 in certain example embodiments of this invention. In such embodiments, the exposed surface of the coated article is coated with a powder type coating. Due to its weathering resistance, surfaces coated in this way are suitable for the outdoor long-term use, although in certain preferred embodiments this coating may be on the interior surface of the glass substrate as shown in FIG. 2. An example advantage of powder coatings is, on the one hand, that the high film thickness (80-100 μm) of the layer 11 allows one to manufacture opaque glass surfaces. On the other hand, the great variety of colors and the targeted use of powder coating effects provide an enormous range of design options. However, it is often difficult for powder paints to form a sufficient compound with a glass or other underlying surface; infiltrated air moisture passing under the powder paint coats can make them peel off soon even in closed rooms.

An advantageous procedure is provided in applying powder layer 11 that allows a weatherproof and durable powder coating to be applied on the surface of the coated article (e.g., on the substrate 1 over layers 3 and 7). A step of cleaning the coated article's surface to be coated is performed using a special cleanser, then applying preserving bonding agents to produce an adhesive joint layer onto which the powder paint is then applied, followed finally by a thermochemical polymeric cross-linkage. The development of a suitable pretreatment of the exposed surface to be coated makes it possible to apply extremely well adherent powder paint layers. Thus, the technique combines a physical surface pretreatment with a wet chemical surface pretreatment in such a way that the layers combine with the underlying layers and/or substrate, with each other, and with the powder paint.

Consider the following example that is provided for purposes of understanding as to how an example powder paint overcoat layer 11 may be applied to the coated article. The exposed surface of the silicon nitride inclusive layer 7 to be coated is precleaned thoroughly with a special cleanser and liberated from organic dirt. The special cleanser may be an acid alcoholic solution in certain example embodiments. After that, an optional base layer is a silicon oxide inclusive layer deposited on the exposed surface of the silicon nitride inclusive layer 7 by flame pyrolysis. As silicon-containing compounds which can be decomposed in the flame, silanes, e.g. tetramethylsilane or siloxane, e.g. hexamethyldisiloxane, may be used. This silicon oxide layer may be from about 10 to 100 nm thick, more preferably from about 5 to 30 nm thick.

The linkage between the activated surface and the powder paint is achieved by application of a wet primer, the composition of which matches the binder base of the respective powder paint system. Primer may be applied to the surface by air brush, dipping or tampon print. To produce a durable and/or weatherproof compound between silicon nitride layer and powder paint, water-substrated as well as solvent-substrated primers may be used. Bonding is based on the good linkage to the optional layer produced by flame pyrolysis (or to the silicon nitride layer 7 itself) and on the adaptation of the chemical structure to the subsequent coating. In certain example embodiments, this primer may be from about 3 to 100 nm thick, more preferably from about 5 to 15 nm thick, with an example primer thickness being about 10 nm. As a last step the exposed surface is coated with powder paint and baked at temperatures specified by the powder paint manufacturer (e.g., from about 100 to 300 degrees C., more preferably from about 150 to 250 degrees C., with a specific example being about 200 degrees C.) in order to cure and/or burn in the lacquer. In certain example embodiments of this invention, the powder paint/lacquer layer may be from about 10 to 1,000 μm thick, even more preferably from about 50 to 500 μm thick, and most preferably from about 100 to 400 μm thick.

In certain example embodiments, the surface pretreatment products may be colorless and need not impair at no time the visual appearance of the powder paints.

Moreover, powder coated glass surfaces manufactured in such a manner have been subjected to appropriate adhesion tests in order to prove their durability. These tests included mainly the salt-spray test according to DIN 50021, the moisture condensate alternating atmosphere test according to VDA (Association of German Automotive Manufacturers), the artificial weathering test according to DIN EN ISO 11507, and an adhesion test according to Erichsen.

The salt-spray test as well as the moisture condensate alternating atmosphere test serves to prove the adhesion of coatings under the influence of salt-laden moisture and continuously changing low and high temperatures. Prior to placing the coated glass panes into the test cells, the powder coat is damaged up to the bottom of the glass over a width of 1 mm using a scratching tool. The measure for the adhesion of the paint is to which extent the moisture has passed under the paint and, therefore, peeled it off. A minimum test duration of 1000 h in the salt-spray test and 7 days (7 cycles) in the moisture condensate alternating atmosphere test is to be reached. For both load types, the adhesion of the powder coat, after subjecting the surface to the preparatory treatment, has been assessed as excellent after repeating various test cycles. Even after extending the load test period, no infiltration of moisture below the powder paint coat at the scratch was detected.

With artificial weathering, the powder paints have been tested for their UV radiation resistance. After a 500 h test the color change according to DIN 6174 and the gloss of the paint coating was assessed. A deterioration of the results compared to the initial parameters could not be detected.

The adhesion test is a mechanical test method applied for the absolute adhesion rating (tensile strength in MPa) of paints. In this method, a test stamp with a diameter of 20 mm is glued with a special adhesive on the powder surface and, after the complete set-up of the adhesive, pulled off in vertical direction. The adhesion test results are judged as being bad in particular if the paint has adhered to the bottom side of the test stamp and has completely been removed from the substrate. Good results are characterized by a coherence failure in the paint or by a failure between the adhesive and the surface of the paint. When testing powder paint coated metal substrates according to this method, test values of more than 5 MPa are assessed as very good. The adhesion values of the powder coated glass surfaces, determined after having subjected the specimens to the load tests required, were between 15 and 20 MPa.

In certain example embodiments, coated articles according to example embodiments of this invention have the following optical characteristics after layers 3 and 7 have been sputter-deposited on the glass substrate 1, but before heat treatment and before the overcoat layer 11 has been applied. These optical characteristics are in accordance with Ill. C, 2 deg. Obs.

TABLE 1

Optical Characteristics (Mono; Pre-HT; No Overcoat)

| Characteristic | General | More Preferred |
|---|---|---|
| $T_{vis}$ (or TY): | 60-90% | 70-80% |
| $a^*_t$: | −6.0 to +6.0 | −4.0 to +2.0 |
| $b^*_t$: | −8.0 to +14.0 | −3.0 to +8.0 |
| $L^*_t$: | 85 to 95 | 88 to 93 |
| $R_g Y$: | 10 to 25% | 14 to 20% |
| $a^*_g$: | −4.5 to +4.0 | −3.0 to +2.0 |
| $b^*_g$: | −15.0 to +10.0 | −12.0 to +4.0 |
| $L^*_g$: | 35 to 55 | 45 to 52 |
| $R_f Y$: | 12 to 25% | 15 to 22% |
| $a^*_f$: | −6.0 to +6.0 | −3.0 to +3.0 |
| $b^*_f$: | −16.0 to +10.0 | −12.0 to +2.0 |
| $L^*_f$: | 40 to 60 | 45 to 55 |

It will be appreciated of course that "f" stands for film side, and "g" stands for glass side. Thus, $R_g Y$ for example stands for glass side reflectance (i.e., reflectance measured from the glass side—as opposed to the film side—of the coated article). Likewise, $a^*_g$ for example stands for a* color measured from the glass side (as opposed to the film side) of the coated article. As yet another example, $R_f Y$ for example stands for film side reflectance (i.e., reflectance measured from the film or coating side of the coated article—as opposed to from the glass side).

Then, following thermal tempering of the coated article including glass 1 and layers 3 and 7, the coated article may have the following optical characteristics.

TABLE 2

Optical Characteristics (Mono; Post-HT; No Overcoat)

| Characteristic | General | More Preferred |
|---|---|---|
| $T_{vis}$ (or TY): | 65-90% | 75-85% |
| $a^*_t$: | −6.0 to +6.0 | −4.0 to +2.0 |
| $b^*_t$: | −8.0 to +14.0 | −2.0 to +7.0 |
| $L^*_t$: | 87 to 95 | 89 to 93 |
| $R_g Y$: | 10 to 25% | 13 to 18% |
| $a^*_g$: | −4.5 to +4.0 | −2.5 to +2.0 |
| $b^*_g$: | −15.0 to +10.0 | −12.0 to +4.0 |
| $L^*_g$: | 35 to 55 | 44 to 50 |
| $\Delta E^*_g$: | <=6.0 | <=4.0 (or <=2.5) |
| $R_f Y$: | 12 to 25% | 14 to 18% |
| $a^*_f$: | −4.0 to +4.0 | −2.0 to +2.0 |
| $b^*_f$: | −16.0 to +10.0 | −12.0 to +2.0 |
| $L^*_f$: | 40 to 60 | 44 to 50 |

Then, after the powder based overcoat 11 is applied to the thermally tempered coated article to result in the coated article shown in FIG. 2, the coated article may have the following optical characteristics. Note that the article is now opaque due to the application of layer 11 so that transmissive optical characteristics are not important; instead, glass side reflective characteristics are important when for example the monolithic coated article, is used as a spandrel coated article with the coating on the interior surface of the glass substrate facing the building interior.

TABLE 3

Optical Characteristics (Mono; Post-HT; With Overcoat)

| Characteristic | General | More Preferred |
|---|---|---|
| $R_g Y$: | 8 to 16% | 10 to 14% |
| $a^*_g$: | −4.0 to +4.0 | −2.0 to +2.0 |
| $b^*_g$: | −20.0 to +10.0 | −15.0 to +4.0 |
| $L^*_g$: | 35 to 50 | 38 to 45 |

The optical characteristics set forth above may be significant. In particular, it has been explained herein that the coating design discussed herein is advantageous in that more consistent optical characteristics can be realized since the coating is more thermally stable (i.e., doesn't change as much during heat treatment). Thus, the final optical characteristics of the coated article are not as dependent on processing conditions such as furnace facilities, heat treatment temperature, heat treatment time, and so forth.

EXAMPLE

An example spandrel coated article was made and tested. The example coated article included, on a glass substrate 1, a $TiO_x$ layer 3 (where x was from about 1.6 to 2.0) about 26 nm thick, and a $Si_3N_4$ layer 7 about 8 nm thick. The coated article was then thermally tempered. After tempering, the primer and powder lacquer overcoat (OC) 11 discussed above was applied as shown in FIG. 2. The coated article of the example had the following optical characteristics at the different stages set forth below. It is noted that "w/OC" means after the opaque overcoat layer 11 has been applied to the heat treated coated article and has been cured as discussed above.

TABLE 4

Optical Characteristics of Example (monolithic)

| Characteristic | Pre-HT (no OC) | Post-HT (no OC) | Post-HT (w/OC) |
|---|---|---|---|
| $T_{vis}$ (or TY): | 75.8% | 80.1% | |
| $a^*_t$: | −1.3 | −1.2 | |
| $b^*_t$: | 5.9 | 4.2 | |
| $L^*_t$: | 89.8 | 91.7 | |
| $R_g Y$: | 17.4% | 15.9% | 12.1% |
| $a^*_g$: | −0.9 | −0.6 | 0.5 |
| $b^*_g$: | −9.6 | −9.3 | −13.0 |
| $L^*_g$: | 48.7 | 46.8 | 41.4 |
| $\Delta E^*_g$: | | 1.95 | |
| $R_f Y$: | 18.7% | 16.3% | |
| $a^*_f$: | 0.1 | 0.2 | |
| $b^*_f$: | −10.9 | −9.9 | |
| $L^*_f$: | 50.4 | 47.4 | |

Surprisingly, it can be seen that the $\Delta E^*_g$ of the above example (valued at about 1.95) was much lower than that of the conventional coating which was over 10.0. This indicates the much improved thermal stability of the coated article, and thus improved predictability and reproducibility.

While the aforesaid example embodiments are discussed in the context of spandrel applications, this invention is not so limited. Coated articles according to other example embodiments of this invention may be used not only in spandrel solutions, substantially matching to windows, but also in other applications involving substantial matching to colored functional wall parts, or functional elements, inside and/or outside of buildings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article for use in spandrel applications, the coated article comprising:
    a glass substrate;
    a layer comprising titanium oxide provided on the glass substrate;
    a layer comprising silicon nitride provided on the glass substrate and located directly over and directly contacting the layer comprising titanium oxide;
    a colored opaque layer provided on the glass substrate over at least the layer comprising titanium oxide and the layer comprising silicon nitride; and
    wherein the coated article is thermally tempered prior to application of the colored opaque layer and has a $\Delta E^*_g$ value of no more than 6.0 due to the thermal tempering.

2. The coated article of claim 1, wherein the coated article has a $\Delta E^*_g$ value of no more than 4.0 due to the thermal tempering.

3. The coated article of claim 1, wherein the coated article has a $\Delta E^*_g$ value of no more than 2.5 due to the thermal tempering, and wherein the titanium oxide is characterized by $TiO_x$, where x is from 1.5 to 2.3.

4. The coated article of claim 1, wherein the coated article consists essentially of the recited layers.

5. The coated article of claim 1, wherein following application of the colored opaque layer the coated article has a glass side reflectance of from about 10-14%, and glass side reflective a* color of from about −2 to +2.

6. The coated article of claim 1, wherein the colored opaque layer comprises a powder paint inclusive layer.

7. The coated article of claim 1, wherein the colored opaque layer comprises a colored enamel frit layer.

* * * * *